United States Patent
Kim

(10) Patent No.: US 9,859,931 B2
(45) Date of Patent: Jan. 2, 2018

(54) RECEIVING APPARATUS AND SIGNAL PROCESSING METHOD THEREOF

(71) Applicant: SAMSUNG ELECTRONICS CO., LTD., Suwon-si (KR)

(72) Inventor: Tae-ho Kim, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 15/227,023

(22) Filed: Aug. 3, 2016

(65) Prior Publication Data

US 2017/0077973 A1    Mar. 16, 2017

(30) Foreign Application Priority Data

Sep. 11, 2015 (KR) .................. 10-2015-0128841

(51) Int. Cl.
*H04B 1/12* (2006.01)
*H04L 27/26* (2006.01)
*H04L 25/03* (2006.01)

(52) U.S. Cl.
CPC ....... *H04B 1/123* (2013.01); *H04L 25/03146* (2013.01); *H04L 27/2605* (2013.01); *H04L 27/265* (2013.01); *H04L 27/2643* (2013.01)

(58) Field of Classification Search
CPC ......... H04L 25/03057; H04L 25/03949; H04L 25/03891; H04L 27/01; H04L 25/0228; H04L 25/03159; H04L 27/2605; H04L 27/265; H04L 27/2643; H04L 25/03146; H04B 1/123
See application file for complete search history.

(56) References Cited

U.S. PATENT DOCUMENTS

| | | | | |
|---|---|---|---|---|
| 7,072,289 B1* | 7/2006 | Yang | ........... | H04J 13/0022 370/208 |
| 2005/0249269 A1* | 11/2005 | Tomasin | ........... | H04B 1/7097 375/148 |
| 2007/0268812 A1* | 11/2007 | Yoon | ........... | H04L 1/0006 370/203 |
| 2008/0232483 A1* | 9/2008 | Yang | ........... | H04L 25/0228 375/260 |
| 2012/0106619 A1* | 5/2012 | Kawauchi | ........... | H04L 25/03057 375/233 |
| 2012/0163507 A1* | 6/2012 | Wang | ........... | H04L 27/0014 375/340 |

\* cited by examiner

*Primary Examiner* — Syed Haider
(74) *Attorney, Agent, or Firm* — Sughrue Mion, PLLC

(57) ABSTRACT

A receiving apparatus is provided. The receiving apparatus may include a receiver, a PN sequence remover, and a zero padding performing unit. The receiver may be configured to receive a frame signal. The PN sequence remover may be configured to remove a first PN sequence from a first frame detected from the frame signal corresponding to a first path to generate a PN removed first frame and remove a second PN sequence from a second frame detected from the frame signal corresponding to a second path to generate a PN removed second frame. The zero padding performing unit may be configured zero pad the first PN removed frame to a size of a discrete Fourier transform (DFT) and zero pad the PN removed second frame to the size of the DFT.

11 Claims, 12 Drawing Sheets

RECEIVING APPARATUS AND SIGNAL PROCESSING METHOD THEREOF

CROSS-REFERENCE TO RELATED APPLICATION

This application claims priority from Korean Patent Application No. 10-2015-0128841, filed in the Korean Intellectual Property Office on Sep. 11, 2015, the disclosure of which is incorporated herein by reference in its entirety.

BACKGROUND

1. Field

Apparatuses and methods consistent with exemplary embodiments relate to a receiving apparatus and a signal processing method thereof and, more particularly, to a receiving apparatus configured to receive a ground wave broadcasting signal, and a signal processing method thereof.

2. Description of Related Art

A digital terrestrial multimedia broadcasting (DTMB) standard, which is a standard for a Chinese HDTV, supports both an orthogonal frequency-division multiplexing (OFDM) scheme and a single carrier scheme. A pilot section of the DTMB system exists in a time domain, and the DTMP system may transmit data using the OFDM (frequency domain transmission) scheme and the single carrier (time domain transmission) scheme. Due to an obstacle, multipath fading may occur, and a synthesis signal formed by the multipath fading may change in strength in terms of time and space, affecting the communication quality.

FIG. 1A illustrates the case where a signal transmitted from an antenna on one side linearly reaches an antenna on the other side, and the case where the signal reaches the antenna by reflecting on a building. The reflection causes delay with respect to the reflected signal in comparison with a linear signal, thereby degrading communication quality.

FIGS. 1B and 1C illustrate a method for solving multipath fading according to a PN mode. A transmission standard of ground wave televisions for China is composed of a TDS-OFDM scheme and a single carrier scheme. The single carrier scheme is composed of three PN modes: PN 420, PN 595, and PN 945.

The PN 420 and PN 945 modes are such that different PNs, that is, different reference signals, are inserted per frame, as illustrated in the first drawing of FIG. 1B, thereby degrading accuracy of data recovery. To solve this problem, PN 420 and PN 495 modes remove the reference signal and change data to a cyclic structure using an overlap add (OLA). Also, data recovery is performed in the state that the reference signal is removed, using 3780 DFT iterative block decision feedback equalization (IBDFE).

FIG. 1C illustrates a PN 595 mode, and the PN 595 mode is such that the same PN, that is the same reference signal, is inserted per frame. Although FIG. 1C distinguishes PN1 from PN2, this is merely to mark the order of PN, and the PN1 and the PN2 actually have the same value. Because the PN1 and the PN2 are identical to each other, a frame may maintain a cyclic structure in case of multipath fading, and the PN 595 mode may recover data using 4375 DFT IBDFE which is obtained by adding 595 (Reference signal) and 3780 (data).

Accordingly, the PN 420 and PN 945 modes which only use data may cause degradation of performance compared with the PN 595 mode which additionally uses a reference signal, bringing about performance deviation between modes. Furthermore, there is a need for 3780 DFT with respect to the PN 420 and PN 945 modes and 4375 DFT with respect to the PN 595 mode, causing complexity in hardware and cost increase.

SUMMARY

One or more exemplary embodiments provide a receiving apparatus configured to recover data by removing a PN sequence from a frame signal received through multipath and performing zero padding, and a signal processing method thereof.

According to an aspect of an exemplary embodiment, there is provided a receiving apparatus, including: a receiver configured to receive a frame signal; a pseudo noise (PN) sequence remover configured to remove a first PN sequence from a first frame detected from the frame signal corresponding to a first path to generate a PN removed first frame and remove a second PN sequence from a second frame detected from the frame signal corresponding to a second path to generate a PN removed second frame; and a zero padding performing unit configured to zero pad the first PN removed frame to a size of a discrete Fourier transform (DFT) and zero pad the PN removed second frame to the size of the discrete DFT.

The zero padding performing unit may be further configured to divide each of the first PN removed frame and the second PN removed frame into a plurality of predetermined time units based on a starting point of a data area of the first frame, and zero pad each of the divided time units.

The apparatus may further include a data recovery unit configured to recover data from the first PN removed frame and the second PN removed frame after the zero padding is performed.

The data recovery unit may be further configured to recover data using iterative block decision feedback equalization (IBDFE).

The PN sequence may be one among a 420 PN sequence, a 595 PN sequence, and a 945 PN sequence.

The size of the DFT may be larger than a data sequence of each of the first frame and the second frame by 945 symbols.

The size of the DFT may be greater than or equal to 4725 symbols.

According to an aspect of another exemplary embodiment, there is provided a method for processing a signal of a receiving apparatus, the method including: receiving a frame signal; removing a pseudo noise (PN) sequence from a first frame detected from the frame signal corresponding to a first path to generate a first PN remove first frame and a second frame detected from the frame signal corresponding to a second path received through another one of the multipath to generate a PN removed second frame; and zero padding the first PN removed frame to a size of a discrete Fourier transform (DFT) and the second PN removed frame to the size of the DFT.

The zero padding may include: dividing each of the first PN removed frame and the second PN removed frame into a plurality of predetermined time units based on a starting point of a data area of the first frame; and performing the zero padding for each of the divided time units.

The method may further include: recovering data from the first PN removed frame and the second PN removed frame after the zero padding is performed.

The recovering the data may include recovering data using iterative block decision feedback equalization (IBDFE).

The PN sequence may be any one of a 420 PN sequence, a 595 PN sequence, and a 945 PN sequence.

The size of the DFT may be larger than a data sequence of each of the first frame and the second frame by 945 symbols.

The size of the DFT may be greater than or equal to 4725 symbols.

According to an aspect of yet another exemplary embodiment, there is provided a non-transitory computer readable recording medium having embodied thereon a program, which when executed by a processor of a receiving apparatus causes the receiving apparatus to execute a signal processing method, the signal processing method including: receiving a frame signal; removing a pseudo noise (PN) sequence from a first frame detected from the frame signal corresponding to a first path to generate a first PN remove first frame and a second frame detected from the frame signal corresponding to a second path received through another one of the multipath to generate a PN removed second frame; and zero padding the first PN removed frame to a size of a discrete Fourier transform (DFT) and the second PN removed frame to the size of the DFT.

BRIEF DESCRIPTION OF THE DRAWINGS

The above and other aspects will become more apparent by reference to exemplary embodiments, aspects of which are illustrated in the appended drawings. Understanding that these drawings depict only exemplary embodiments of the disclosure and are not therefore to be considered to be limiting of the scope of the disclosure, the principles herein are described and explained with additional specificity and detail through the use of the accompanying drawings, in which.

DETAILED DESCRIPTION

Figure 1A:
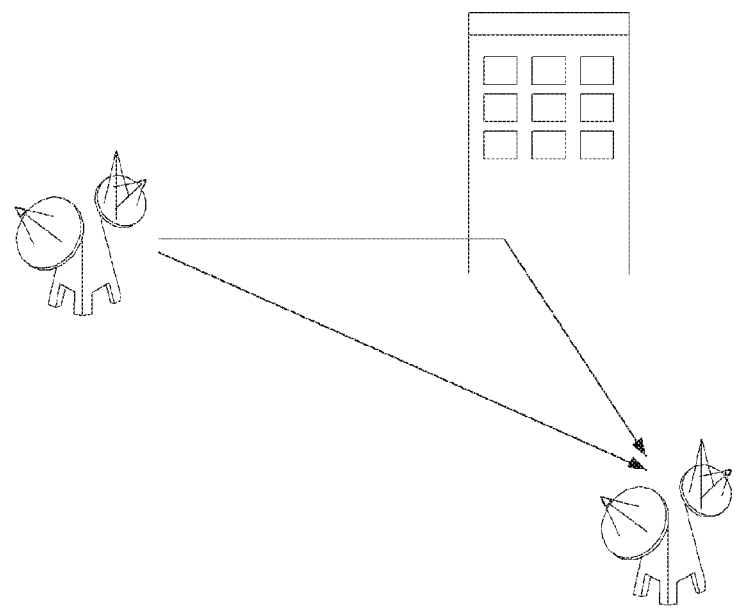
FIGS. 1A, 1B and 1C illustrate solving a problem generated by multipath fading when using an equalizer based on a single carrier.
Figure 1B:
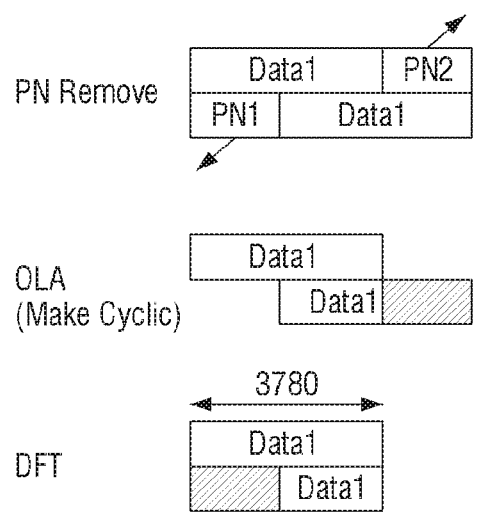
Figure 1C:
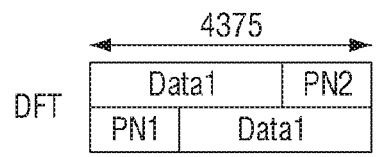

Exemplary embodiments may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

In the present specification, a singular expression may be used for convenience of explanation, but unless the expression has an obvious different meaning in the context, it may be understood as a concept that includes plural expressions as well. In addition, the terms used in the present specification may have a same meaning with what is commonly understood by those skilled in the art. The terms defined in a general dictionary of all the terms used in the present specification may be understood to have a same or similar meaning with the meaning in the context of the related art, and unless a term is specifically defined in the present specification, the term is not to be understood to have a meaning that is ideal or excessively perfunctory. Depending on the situation, even if a term is defined in the present specification, it may not be understood to exclude exemplary embodiments of the present specification.

Various exemplary embodiments are described in greater detail below with reference to the accompanying drawings.

Figure 2:
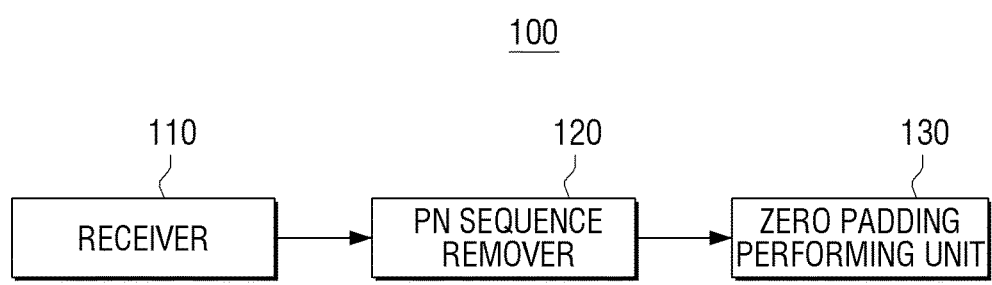
FIG. 2 shows a block diagram of a configuration of a receiving apparatus according to an exemplary embodiment.

FIG. 2 shows a block diagram of a configuration of a receiving apparatus 100 according to an exemplary embodiment.

As illustrated in FIG. 2, the receiving apparatus 100 may include a receiver 110, a PN sequence remover 120, and a zero padding performing unit.

The receiver 110 may receive a frame signal having a PN sequence. In this example, the receiver 100 may include various components, such as an antenna, etc. The frame signal may include a plurality of frames, which may refer to a signal which undergoes encoding, interleaving, modulation, etc. on the transmitting side. The PN sequence may refer to any one of a 420 PN sequence, a 595 PN sequence, and a 945 PN sequence. The detailed description of PN sequence will follow.

The receiver 110 may receive a frame signal through multipath. That is, the receiver 100 may receive a synthesis signal corresponding to the frame signal through multipath. In this example, the synthesis signal may refer to a signal of which the strength is changed in terms of time and space compared with the frame signal.

The receiver 110 may detect a first frame from a frame signal received through one path of multipath, and detect a second frame from a frame signal received through another path of the multipath. In this example, the first frame and the second frame may differ in time and space. For example, the first frame may be detected before than the second frame.

The PN sequence remover 120 may remove a PN sequence from the first frame detected from a frame signal received through one path of multipath and the second frame detected from a frame signal received through another path of the multipath. For example, the PN sequence remover 120 may sequentially remove a PN sequence of each of the first frame and the second frame which is detected 0.1 ms later than the first frame. However, the example is not limited thereto, and the PN sequence remover 120 may remove a PN sequence of the first frame and then remove a PN sequence from the second frame.

The PN sequence remover 120 may remove a PN sequence regardless of the type of PN sequence being received. For example, the PN sequence remover 120 may remove a PN sequence regardless of the type, such as 420 PN sequence, 595 PN sequence and 945 PN sequence.

The 420 PN sequence, 595 PN sequence and 945 PN sequence may be selected by a user, and the PN sequence remover 120 may remove a PN sequence of a first frame and a second frame based on the type of PN sequence selected by the user. For example, in the case where the user selects a 420 PN sequence, the PN sequence remover 120 may remove the first 420 symbols from a frame, determines the next 3780 symbols as data symbols, and remove the next 420 symbols. The PN sequence remover 120 may repeat this process to remove a PN sequence from a frame according to the type of PN sequence selected by the user.

The zero padding performing unit 130 may perform zero padding in a manner that each of the first frame from which a PN sequence is removed and the second frame from which the PN sequence is removed correspond to the size of a discrete fourier transform (DFT). For example, when a frame signal including a 420 PN sequence is received, a PN sequence and a data sequence may be periodically repeated by units of 4200 symbols obtained by adding 420 (Reference Signal) and 3780 (data). If the size of a DFT is 4725 symbols, the zero padding performing unit 130 may perform zero padding to 525 symbols, which is the difference between the size of DFT and a unit of period between a PN sequence and a data sequence.

The zero padding performing unit 130 may divide each of a first frame and a second frame into a plurality of predetermined time units based on a starting point of a data area of the first frame, and perform zero padding per divided time unit. For example, as described above, the zero padding performing unit 130 may set one data sequence and a PN sequence after the data sequence as a basic time unit to divide a frame into a plurality of time units.

In this case, the zero padding performing unit 130 may divide the second frame into a plurality of time units to correspond to a time unit of the first frame. For example, when the second frame is detected later than the first frame, the zero padding performing unit 130 may divide the second frame based on any one symbol among PN sequences of the second frame. However, the example is not limited thereto, and when the second frame is detected before the first frame, the zero padding performing unit 130 may divide the second frame based on any one symbol among data sequences of the second frame.

The zero padding performing unit 130 may perform zero padding to a frame divided into a plurality of time units for each of a plurality of time units, and control each of the plurality of time units to be a cyclic frame. When each of the plurality of time units becomes a cyclic frame, a reliability of data recovery may be improved. A cyclic frame will be described in greater detail below.

Meanwhile, the receiving apparatus 100 may further include a data recovery unit which recovers data from a first frame and a second frame after zero padding is performed. The data recovery unit 130 may recover data using iterative block decision feedback equalization (IBDFE), and the detailed description thereof will follow.

As described above, a PN sequence may be any one of a 420 PN sequence, a 595 PN sequence, and a 945 PN sequence, and may be operated the same no matter what sequence is included in a received frame signal. Even if a standard of DTMB is changed, or a special standard is added and a new PN sequence is added, it may be operated the same by changing the number of zero-padding symbols.

The size of DFT may be controlled to be larger than a data sequence of each of the first frame and the second frame by more than 945 symbols. Therefore, the same operation may be performed with respect to all of the currently-defined 420 PN sequence, 595 PN sequence and 945 PN sequence. In particular, the minimum size of DFT which guarantees the same operation with respect to the currently-defined standard may be 4725 symbols. Specifically, the minimum size of DFT may be 4725 symbols obtained by adding 945 (reference signal) and 3780 (data).

Figure 3:
FIG. 3 is a view provided to explain a structure of a frame according to an exemplary embodiment.
Figure 3:
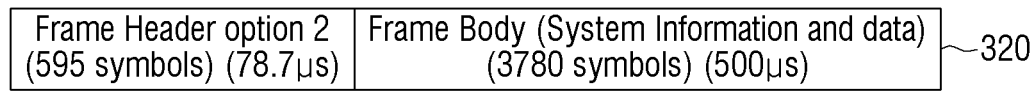
Figure 3:
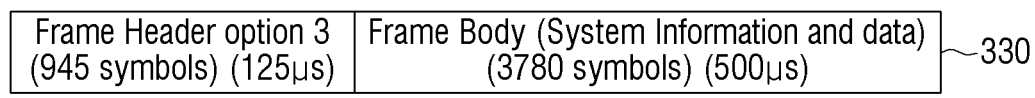

FIG. 3 is a view provided to explain a structure of a frame according to an exemplary embodiment.

According to FIG. 3, a frame received and detected from the receiving apparatus 100 may be divided into a frame header and a frame body. In this example, a frame of each signal composed of a frame header and a frame body as illustrated in FIG. 3 may be called "signal frame," and a predetermined number of "signal frames" may constitute a "super frame," to thereby constitute a schematized frame structure.

According to the number of PN sequences inserted into a frame header portion, a frame may be divided into a 420 PN sequence 310 that includes 420 symbols, a 595 PN sequence 320 that includes 595 symbols, or a 945 PN sequence 330 that includes 945 symbols. In this example, each of the PN sequences may be generated on the transmitting side by PN sequence generators (for example, linear feedback shift register (LFSR)) in different forms, wherein each of the PN sequences are of no relevance to each other and independent from each other.

A frame body of each of the PN sequences has a total of 3780 symbols. The frame body is an area which receives data information, and includes a signal that is modulated according to a quadrature amplitude modulation (QAM) scheme in various forms, such as 4 QAM, 16QAM, etc.

Although three types of PN sequences are discussed, that is, 420 PN sequence 310, 595 PN sequence 320, and 945 PN sequence, the technical feature of the present disclosure may be applied to other PN sequences.

FIGS. 4A, 4B, 4C and 4D are provided to explain a method for performing zero padding according to an exemplary embodiment.

Figure 4A:
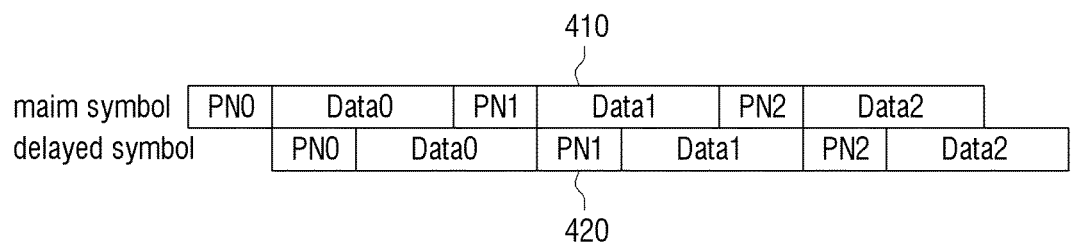
FIGS. 4A, 4B, 4C AND 4D illustrate a method for performing zero padding according to an exemplary embodiment.

According to FIG. 4A, the receiver 100 may receive a frame signal through multipath. In particular, the receiver 110 may detect a first frame 410 and a second frame 420 respectively from a frame signal received through one path of the multipath and a frame signal received through another path of the multipath. The first frame 410 and the second frame 420 may be detected at a different time because a frame signal is received through multipath. Hereinafter, the upper portion of FIG. 4A will be called the first frame 410, and the lower portion, the second frame 420.

Although FIG. 4A illustrates that a starting point of a data sequence of the first frame 410 is identical to a starting point of a PN sequence of the second frame 420, it is merely an example. For example, a starting point of a PN sequence of the second frame 420 may be identical to a starting point of an intermediate symbol of a PN sequence or data sequence of the first frame 410. However, in general, because the detection time is not significantly different between the first frame 410 and the second frame 420 due to multipath, the example will be introduced and described with reference to FIG. 4A.

Figure 4B:
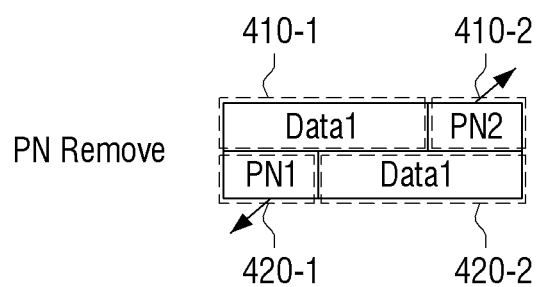

FIG. 4B illustrates a data sequence 1 410-1 and PN sequence 2 410-2 of the first frame 410 and a PN sequence 1 420-1 and data sequence 1 420-2 of the second frame 420. The PN sequence remover 120 does not perform an operation of dividing a frame into a plurality of predetermined time units; however, for convenience of explanation, part of the first frame 410 and the second frame 420 are illustrated based on a starting point of a data sequence of the first frame 410. Although the data sequence 1 410-1 and the data sequence 1 420-2 are identical, an identification symbol is added to distinguish them according to the first frame 410 and the second frame 420.

The PN sequence remover 120 may remove the PN sequence 2 410-2 from the first frame 410 and the PN sequence 1 420-1 from the second frame 420. The removed PN sequence 2 410-2 of the first frame 410 and PN sequence 1 420-1 of the second frame 420 may have a symbol having a value of 0.

The PN sequence remover 120 may remove a PN sequence according to the type of PN sequence corresponding to a broadcasting channel selected by a user. For example, when the user selects a broadcasting channel corresponding to a 595 PN sequence, the PN sequence remover 120 may remove the 595 PN sequence.

Figure 4C:
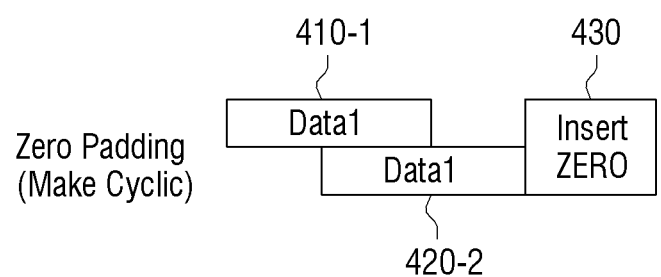

According to FIG. 4C, the zero padding performing unit 130 may perform zero padding such that the first frame 410 from which the PN sequence 2 410-2 is removed and the second frame 420 from which the PN sequence 1 is removed corresponds to the size of DFT. For example, the zero padding performing unit 130 may zero pad a symbol after the PN sequence 2 410-2 removed from the first frame 410 to a size of DFT. Also, the zero padding performing unit 130 may zero pad a symbol after the data sequence 1 420-2 of the second frame 420 to a size of DFT.

As described above, the zero padding performing unit 130 may divide each of the first frame 410 and the second frame 420 into a plurality of predetermined time units based on a starting point of a data area of the first frame 410, and perform zero padding per divided time unit.

The zero padding unit 130 may be part of DFT. For example, the first frame 410 and second 420 from which a PN sequence is respectively removed by the PN sequence remover 120 are input to DFT per divided time unit, and symbols that fall short of a size of DFT may be input zero.

However, the example is not limited thereto, and the zero padding performing unit 130 may be separate from DFT. In this case, the first frame 410 and second frame 420 from which a PN sequence is respectively removed by the PN sequence remover 120 may be zero padded per time unit divided by the zero padding performing unit 130 before being input to DFT. Because the frames are zero padded before DFT is input, the length of sequence may increase per divided time unit.

Although it is described that a zero padding symbol section 430 is from a symbol subsequent to the PN sequence 2 410-2 removed from the first frame 410 and a symbol subsequent to the data sequence 1 420-2 of the second frame 420 to a symbol corresponding to a size of DFT, it is not limited thereto. For example, the zero padding symbol section 430 may be a symbol section prior to the data sequence 1 410-1 of the first frame 410 and a section prior to the PN sequence 1 420-1 removed from the second frame 420. In addition, in the case where a time unit section of the first frame 410 and the second frame 420 may maintain a cyclic frame, it does not matter where the frames are zero padded.

The cyclic frame has two frames of the same size, and has the same data sequence; however, one frame is delayed compared with the other frame. For example, it may, as a non-limiting example, be such that one frame has the value of 0 0 1 2 3 4 5 0 0 0, and the other frame has the value of 0 0 0 0 1 2 3 4 5 0 0.

However, the cyclic frame may as well be such that the case where one frame is circulated compared with the other frame is cyclic frames. For example, one frame having the value of 0 0 1 2 3 4 5 0 0 0 and the other frame having the value of 5 0 0 0 0 0 1 2 3 4 may be seen as cyclic frames.

PN sequences that may have different values may be removed by the PN sequence remover 120 to form cyclic frames, improving a recovery reliability of data.

Figure 4D:
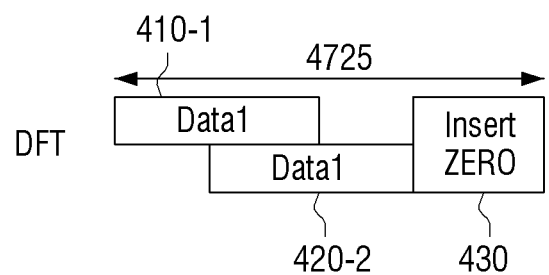

FIG. 4D illustrates a method for determining a size of DFT according to an exemplary embodiment. As described above, a PN sequence may be any one of a 420 PN sequence, a 595PN sequence, and a 945 PN sequence. Accordingly, to enable zero padding to maintain a cyclic frame regardless of the type of PN sequence, the case where the 945 PN sequence is detected will be described. For example, when the size of DFT is 4725 symbols and a 945 PN sequence is detected, a frame of 945 (Reference Signal)+3780 (data) is the same as the size of DFT and thus, no zero padding is necessary. If the size of DFT is 4725 symbols and a 420 PN sequence or a 595 PN sequence is detected, a new zero padding corresponding to the difference is needed. Accordingly, the minimum size of DFT needed to configure the same hardware regardless of the type of PN sequence is 4725 symbols.

Even if a sequence is larger than the 945 PN sequence, the same operation may be performed by enlarging the size of DFT. As described above, it is possible to recover a data sequence using only one hardware regardless of the type of PN sequence according to an operation of the zero padding performing unit 130.

Figure 5:
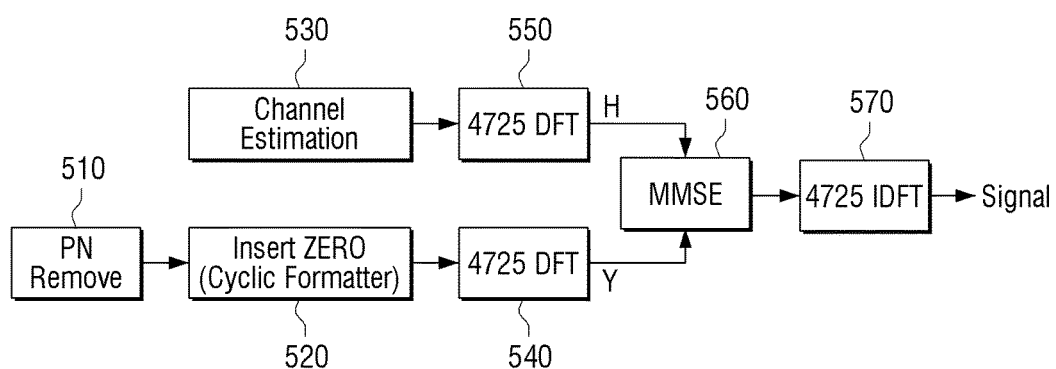
FIG. 5 is a view provided to explain a pre-processing method to recover a data sequence according to an exemplary embodiment.

FIG. 5 is a view provided to explain a pre-processing method for recovering a data sequence according to an exemplary embodiment.

A PN sequence remover 510 and a zero padding performing unit (cyclic formatter) 520 have been described above, and thus the detailed description thereof will be omitted herein.

A channel estimation unit 530 performs an operation of estimating channel information from a received frame signal. The channel estimation unit 530 may calculate a correlation value through a predetermined computation using the same reference synchronization signal as a PN sequence which is a synchronization signal appointed between the received frame signal and a transmitting apparatus and a receiving apparatus, and estimate channel information using the correlation value.

However, the example is not limited thereto, and the channel estimation unit 530 may remove part of the correlation value to transmit channel information. For example, the channel estimation unit 530 may detect a position of a peak having the highest value among the correlation values, remove a part having a value less than a predetermined threshold value from correlation values of a predetermined section including the corresponding position, and then estimate channel information.

Signals that have gone through the zero padding performing unit 520 and the channel estimation unit 530 are signals of a time domain, and may respectively pass the DFT units 540 and 550 to be converted into signals of a frequency area. The DFT units 540, 550 may discrete fourier transform (DFT) the received signal to convert them into a frequency area.

Figure 6:
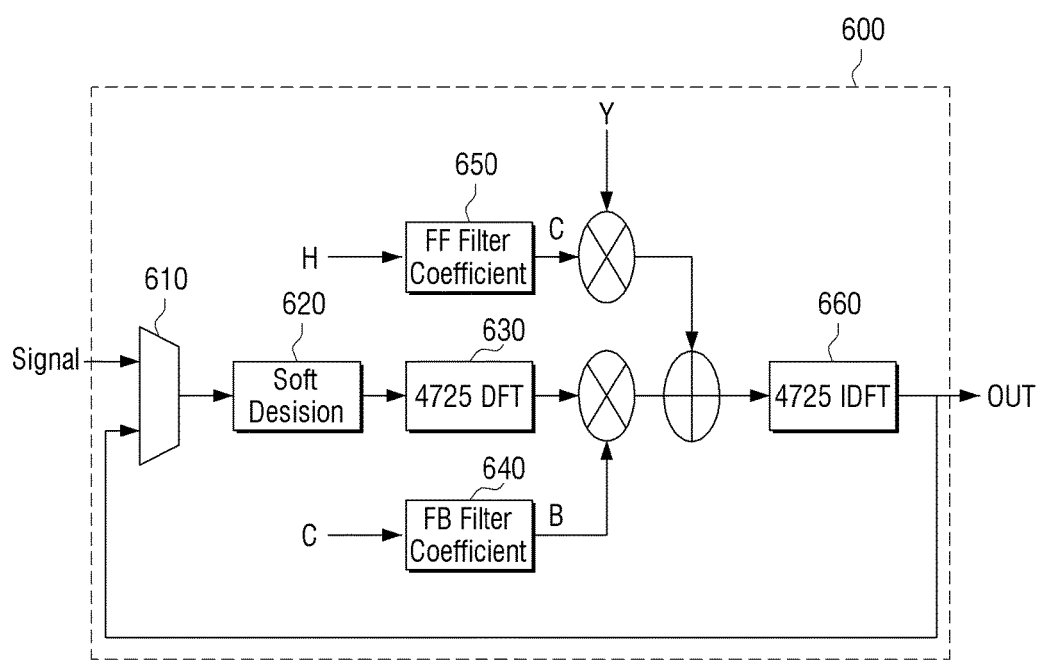
FIG. 6 is a view provided to explain an equalization method for recovering data sequence according to an exemplary embodiment.

A signal H which is a signal having gone through the zero padding performing unit 520 is converted into a frequency area and a signal Y which is a signal having gone through the channel estimation unit 530 is converted to the frequency area are used for the IBDFE of FIG. 6, and detailed description will follow.

A minimum mean square error (MMSE) equalizer 560 may output a signal from which an interference between carrier waves is removed based on an MMSR by receiving input of the signal H which is a signal having gone through the zero padding performing unit 520 is converted into the frequency area and the signal Y which is a signal having gone through the channel estimation unit 530 is converted to the frequency area. The MMSE equalizer 560 may control the entire estimation error to be minimized in consideration of noise by using a second moment of a channel, such as auto-correlation and cross-correlation.

An IDFT unit 570 may output a signal which is converted into a time area by performing an Inverse DFT calculation to a signal output from the MMSE equalizer 560. The converted signal may be an input signal of the IBDFE.

Although it is illustrated in FIG. 5 that a 4725 DFT and a 4725 IDFT are used, the example is not limited thereto, and it does not matter as long as the size of a DFT and an IDFT exceeds a predetermined size.

FIG. 6 is a view provided to explain an equalization method for recovering data sequence according to an exemplary embodiment of the present disclosure.

An iterative block decision feedback equalization (IBDFE) 600 includes a multiplexer 610, a soft decision unit 620, a DFT unit 630, a feedback (FB) filter coefficient generator 640, a feedforward (FF) filter coefficient generator 650, and an IDFT unit 660.

The multiplexer 610 may receive a signal converted into a time area and a recovered data stream (OUT), and transmit any one of them to the soft decision unit 620. For example, the multiplexer 610 may first transmit a PN sequence 1 and a data sequence 1 to the soft decision unit 620, and then transmit the recovered data stream (OUT) to the soft decision unit 620 for a predetermined number of times. Then, when a PN sequence 2 and a data sequence 2 are input, the multiplexer 610 may first transmit the PN sequence 2 and the data sequence 2 to the soft decision unit 620, and then transmit a recovered data stream (OUT) to the soft decision unit 620 for a predetermined number of times. In this example, the recovered data stream (OUT) is feedback and input to the multiplexer 610.

The soft decision unit 620 may receive a signal converted into a time area or a recovered data stream from the multiplexer 610, and make soft-decision.

The signal that went through the soft decision unit 620 is a signal of a time area, and may be converted to a signal of a frequency area via the DFT unit 630. The DFT unit 630 may discrete Fourier transform (DFT) the received signal and convert the signal into the frequency area.

The FB filter coefficient generator 640 may derive a FB filter coefficient (B) from a FF filter coefficient (C) output from a later-mentioned FF filter coefficient generator 650.

The FF filter coefficient generator 650 may derive the FF filter coefficient (C) from the signal H which is a signal having gone through the zero padding performing unit 520 is converted into the frequency area.

The signal that went through the soft decision unit 620 and the DFT unit 630 is multiplied by the FB filter coefficient (B), and the signal Y which is a signal having gone through the channel estimation unit 530 is converted into the frequency area is multiplied by the FF filter coefficient (C). The multiplied signals are added together and input to the IDFT unit 660.

The IDFT unit 660 may perform an inverse DFT calculation to the input signal and convert the signal into a time area and recover a data stream (OUT).

Although it is illustrated in FIG. 6 that a 4725 DFT and a 4725 IDFT are used, the example is not limited thereto, and it does not matter as long as the sizes of DFT and IDFT exceed a predetermined size.

Figure 7:
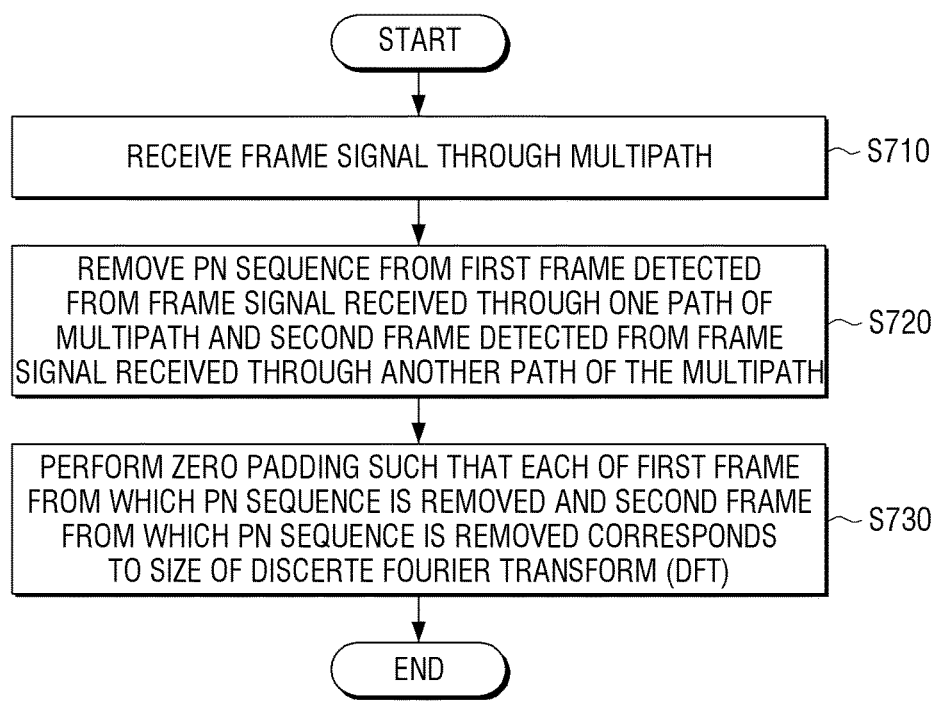
FIG. 7 shows a flowchart of a method for processing a signal of a receiving apparatus according to an exemplary embodiment.

FIG. 7 is a flowchart provided to explain a method of processing a signal of a receiving apparatus according to an exemplary embodiment of the present disclosure.

According to FIG. 7, a receiving apparatus may receive a frame signal through multipath at operation S710. Then, the receiving apparatus may remove a PN sequence from each of a first frame detected from a frame signal received through one path of the multipath and a second frame detected from a frame signal received through another path of the multipath, at operation S720. Then, the receiving apparatus may perform zero padding such that each of the first frame and the second frame from which the PN sequence is removed corresponds to a size of a discrete Fourier transform (DFT), at operation S730.

In this example, the performing zero padding at operation S730 may include dividing each of the first frame and the second frame into a plurality of predetermined time units based on a starting point of a data area of the first frame and performing zero padding for each of the divided time units.

Meanwhile, the performing zero padding may further include recovering data from the first frame and the second frame after zero padding is performed.

In particular, the recovering data may include recovering data using iterative block decision feedback equalization (IBDFE).

Meanwhile, a PN sequence may be any one of a 420 PN sequence, a 595 PN sequence, and a 945 PN sequence.

In addition, the size of a DFT may be larger than a data sequence of each of the first frame and the second frame by more than 945 symbols.

In particular, the size of a DFT may be larger than or equal to 4725 symbols.

According to the various exemplary embodiments of the present disclosure, the receiving apparatus may remove a PN sequence from a frame signal received through multipath, and perform zero padding, thereby improving accuracy of data recovery. Also, data may be recovered using only one type of DFT, which causes cost reduction.

The methods according to such various exemplary embodiments may be programmed and stored in various storage mediums. Accordingly, the methods according to the above-mentioned various exemplary embodiments may be realized in various types of electronic apparatuses to execute a storage medium.

Specifically, according to an exemplary embodiment of the present disclosure, a non-transitory computer readable medium may be provided to store a program which sequentially performs receiving a frame signal through multipath, removing a PN sequence from each of a first frame detected from a frame signal received through one path of the multipath and a second frame detected from the frame signal received through another path of the multipath, and perform zero padding such that each of a first frame from which the PN sequence is removed and a second frame from which the PN sequence is removed corresponds to a size of a discrete Fourier transform (DFT).

A non-transitory computer readable medium may refer to a machine-readable medium or device that stores data semi-permanently and not for a short period of time such as a register, cache, memory, and the like. The aforementioned various applications or programs may be stored in a non-transitory computer readable medium such as a compact disc (CD), a digital versatile disc (DVD), a hard disk, a Blu-ray disc, a Universal Serial Bus (USB) stick, a memory card, a ROM, etc.

Further, the above one or more exemplary embodiments describe non-limiting exemplary embodiments, which may be modified and embodied by one of ordinary skill without going beyond the concept of the present disclosure recited in the claims as well, and these modified embodiments should not be understood individually from the technical idea or prospect of the present disclosure.

What is claimed is:

1. A receiving apparatus, comprising:
a receiver configured to receive a frame signal;
a pseudo noise (PN) sequence remover configured to remove a PN sequence included in a first frame of the frame signal received through a first path and remove a PN sequence included in a second frame of the frame signal received through a second path different from the first path;
a zero padding performing unit configured to, zero pad the PN removed first frame to a size of a discrete Fourier transform (DFT),
and zero pad the PN removed second frame to the size of the DFT; and
a data recovery unit configured to recover data from the PN removed first frame and the PN removed second frame after the zero padding is performed,
wherein the second frame is received later than the first frame, and
wherein the zero padding performing unit is further configured to divide each of the PN removed first frame and the PN removed second frame into a plurality of predetermined time units based on a starting point of a data area of the first frame, control each of the plurality of time units to be a cyclic frame, and zero pad each of the divided time units.

2. The apparatus as claimed in claim 1, wherein the data recovery unit is further configured to recover data using iterative block decision feedback equalization (IBDFE).

3. The apparatus as claimed in claim 1, wherein the PN sequence is one among a 420 PN sequence, a 595 PN sequence, and a 945 PN sequence.

4. The apparatus as claimed in claim 1, wherein the size of the DFT is larger than a data sequence of each of the first frame and the second frame by 945 symbols.

5. The apparatus as claimed in claim 1, wherein the size of the DFT is greater than or equal to 4725 symbols.

6. A method for processing a signal of a receiving apparatus, the method comprising:
receiving a frame signal;
removing a pseudo noise (PN) sequence included in a first frame of the frame signal received through a first path and a PN sequence included in a second frame of the frame signal received through a second path different from the first path;
zero padding the PN removed first frame to a size of a discrete Fourier transform (DFT) and the PN removed second frame to the size of the DFT; and
recovering data from the PN removed first frame and the PN removed second frame after the zero padding is performed,
wherein the second frame is received later than the first frame, and
wherein the zero padding comprises:
dividing each of the PN removed first frame and the PN removed second frame into a plurality of predetermined time units based on a starting point of a data area of the first frame;
controlling each of the plurality of time units to be a cyclic frame; and
performing the zero padding for each of the divided time units.

7. The method as claimed in claim 6, wherein the recovering the data comprises recovering data using iterative block decision feedback equalization (IBDFE).

8. The method as claimed in claim 6, wherein the PN sequence is any one of a 420 PN sequence, a 595 PN sequence, and a 945 PN sequence.

9. The method as claimed in claim 6, wherein the size of the DFT is larger than a data sequence of each of the first frame and the second frame by 945 symbols.

10. The method as claimed in claim 6, wherein the size of the DFT is greater than or equal to 4725 symbols.

11. A non-transitory computer readable recording medium having embodied thereon a program, which when executed by a processor of a receiving apparatus causes the receiving apparatus to execute a signal processing method, the signal processing method comprising:
receiving a frame signal;
removing a pseudo noise (PN) sequence included in a first frame of the frame signal received through a first path and a PN sequence included in a second frame of the frame signal received through a second path different from the first path;
zero padding the PN removed first frame to a size of a discrete Fourier transform (DFT) and the PN removed second frame to the size of the DFT; and
recovering data from the PN removed first frame and the PN removed second frame after the zero padding is performed,
wherein the second frame is received later than the first frame, and
wherein the zero padding comprises:
dividing each of the PN removed first frame and the PN removed second frame into a plurality of predetermined time units based on a starting point of a data area of the first frame;
controlling each of the plurality of time units to be a cyclic frame; and
performing the zero padding for each of the divided time units.

* * * * *